United States Patent
Parsadayan et al.

(10) Patent No.: US 8,285,271 B1
(45) Date of Patent: Oct. 9, 2012

(54) WIRELESS TELEPHONE INTERFACE FOR REMOTE COMMAND OF AN OPERATOR FOR AN AUTOMATIC GATE

(75) Inventors: Alex Parsadayan, Monarch Beach, CA (US); Wayne C. Hom, Coto de Caza, CA (US)

(73) Assignee: Maximum Controls, LLC

( * ) Notice: Subject to any disclaimer, the term of this patent is extended or adjusted under 35 U.S.C. 154(b) by 0 days.

(21) Appl. No.: 13/136,934

(22) Filed: Aug. 15, 2011

(51) Int. Cl.
*H04M 3/00* (2006.01)

(52) U.S. Cl. ........ 455/420; 455/419; 455/418; 379/219; 340/5.7; 348/156

(58) Field of Classification Search .................. 455/420, 455/419, 418; 379/219; 348/156; 340/5.7
See application file for complete search history.

(56) References Cited

U.S. PATENT DOCUMENTS

| | | | |
|---|---|---|---|
| 4,937,855 A | 6/1990 | McNab et al. | |
| 5,303,300 A | 4/1994 | Eckstein | |
| 6,041,106 A | 3/2000 | Parsadayan et al. | |
| 6,218,956 B1 * | 4/2001 | Davis et al. | 340/5.2 |
| 6,882,715 B2 | 4/2005 | Hom | |
| 7,031,665 B1 * | 4/2006 | Trell | 455/70 |
| 2005/0180406 A1 * | 8/2005 | Sagiv | 370/353 |
| 2006/0171521 A1 * | 8/2006 | Allen et al. | 379/219 |
| 2008/0106370 A1 * | 5/2008 | Perez et al. | 340/5.7 |
| 2008/0204559 A1 * | 8/2008 | Nassimi | 348/156 |
| 2010/0178943 A1 * | 7/2010 | Nassimi | 455/462 |

* cited by examiner

*Primary Examiner* — Danh Le
(74) *Attorney, Agent, or Firm* — Leonard Tachner

(57) ABSTRACT

A wireless telephone interface for use with the control operator of an automatic gate system. A device utilized as a telephone extension device where a user can remotely call the device and by entering a code, can wirelessly command the gate operator to initiate a movement of the gate to either an open or closed position. This system is designed as a direct telephone interface without the complexity of a telephone entry system. The key benefit is a programmable hold open time "per command".

2 Claims, 2 Drawing Sheets

WIRELESS TELEPHONE INTERFACE FOR REMOTE COMMAND OF AN OPERATOR FOR AN AUTOMATIC GATE

BACKGROUND OF THE INVENTION

1. Field of the Invention

The present invention relates generally to the field of automatic gates such as those used for control of vehicle access to a residential or commercial property. The invention herein relates more specifically to a telephone extension device, which a user can employ to remotely call and enter a code to wirelessly command a gate operator to initiate gate movement to either an open or closed position. A particularly unique capability thereof is a programmable hold time, which will keep the gate open for a selected amount of time before it automatically closes.

2. Background Discussion

There have been numerous products over the recent past that incorporate a remote phone accessed gate command. Such systems are disclosed for example in issued U.S. Pat. Nos. 4,937,855; 5,303,300; 6,041,106; and 6,882,715. These systems are primarily intercom systems that connect to the telephone network within a residential home, housing complex or secured commercial building. They permit a nearby resident to initiate gate operation to permit entry to a person or vehicle after suitable identification has been conveyed over the telephone.

SUMMARY OF THE INVENTION

The present invention, it its preferred embodiment, comprises a wireless telephone interface for use with the control operator of an automatic gate system. A device utilized as a telephone extension device where a user can remotely call the device and by entering a code, can wirelessly command the gate operator to initiate a movement of the gate to either an open or closed position.

This system is designed as a direct telephone interface without the complexity of a telephone entry system. The key benefit is a programmable hold open time "per command".

The preferred embodiment has the following specifications:

1. Capable of being plugged into any standard telephone jack.
2. Selectable number of rings in auto-answer mode.
3. DTMF detection for authorized 'PIN' entry as well as commands.
4. Effective wireless range (direct line-of-sight) of 1500 feet, normal range, and up to 2500 feet for extended range units.
5. Field programmable 'PIN' access number; Factory default PIN="Last four digits of serial number". Field programming is to be performed only in auto-answer mode.
6. Built-in voice prompts utilizing pre-recorded prompts.
7. Auto listen mode for a pre-determined period of time whenever a telephone call is answered by a telephone on the network or when activated though the auto-answer function. This will preserve the functionality of the device when the phone call is prematurely answered.
8. Auto lockout feature for a preset period of time to prevent unauthorized access. Auto lockout is activated through multiple sequential incorrect attempts to enter a pin number. Lockout is cleared with the entry of the correct PIN code or after the pre-determined period of time.
9. Ability to command duration of open command by a second digit entry indicating momentary or durations of time to hold the gate open.

BRIEF DESCRIPTION OF THE DRAWINGS

The aforementioned objects and advantages of the present invention, as well as additional objects and advantages thereof, will be more fully understood herein after as a result of a detailed description of a preferred embodiment when taken in conjunction with the following drawings in which.

DETAILED DESCRIPTION OF A PREFERRED EMBODIMENT

Referring to the accompanying drawings, it will be seen that in the preferred embodiment of the present invention, a telephone interface device is connected to an ordinary phone line using any standard phone jack. The interface device should be capable of converting standard DTMF signals into a digital representation that is compatible with a CPU or central processing unit. Also connected to the CPU are memory, a keypad and an LCD display. The memory chip provides for voice and data storage. Voice storage permits the system to store selected voice prompts which are used to tell the remote caller to enter various commands and a pin number in a timely handshake fashion. Data storage is primarily for local programming and operational protocol. The key pad and display permit local programming of answer mode, numbers of rings, pin number entry and auto lockout timing. A receiver/transmitter is employed for wireless communication between the preferred embodiment hereof and the corresponding gate control operator which actually opens and closes an automatic gate in response to user commands received by the telephone interface.

Figure 1:
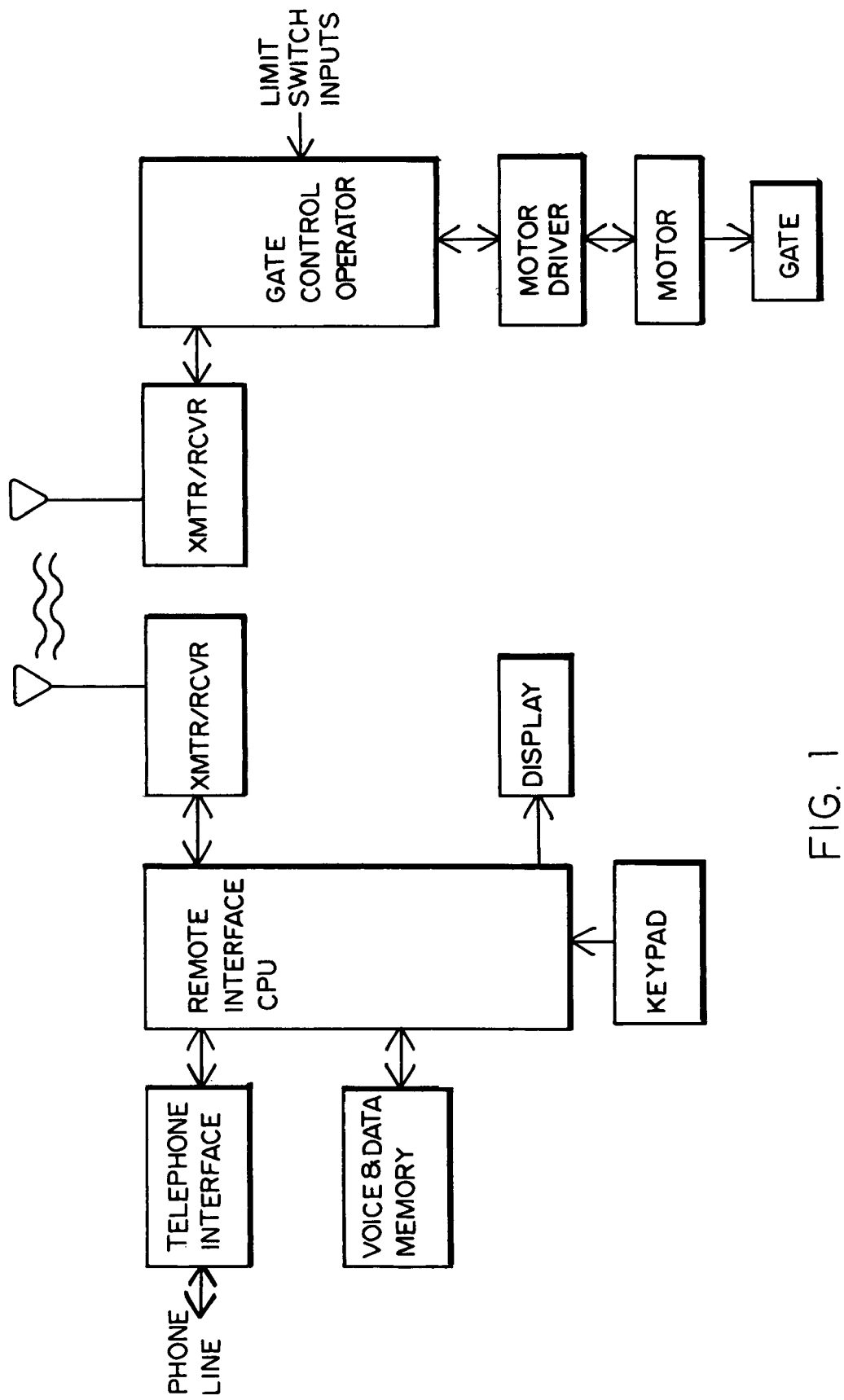
FIG. 1 is a block diagram showing the principal components of a preferred embodiment of the invention and the wireless interface to a gate control system.
Figure 2:
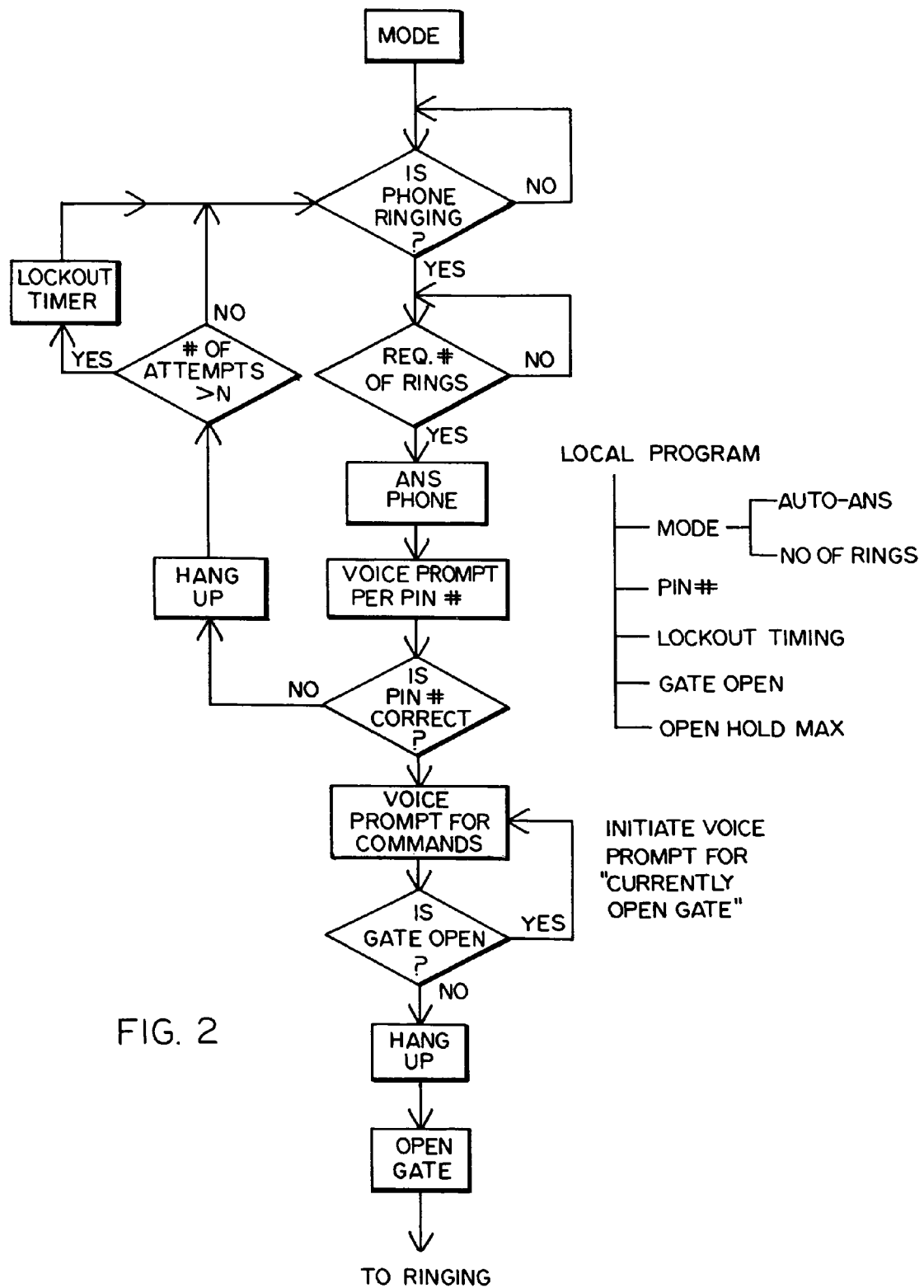
FIG. 2 is a flow chart of decisions and actions of the preferred embodiment of FIG. 1 in the normal operation thereof.

Operation of the invention in its standard function mode, may be best understood by referring to the flow chart of FIG. 2. Local program parameters are shown in the upper right-hand corner of FIG. 2. These include auto-answer mode and the number of rings before answering, pin number and lockout timing. Allowable gate hold functions are also programmable parameters which can be entered using the key pad and display of FIG. 1.

The flow chart portion of FIG. 2 indicates that general operation begins with mode selection and listening for phone ringing a requisite number of times before the phone is answered and a voice prompt for a pin number is given. A lockout timing loop is initiated for incorrect pin numbers. If the pin number is correct, voice prompts for commands are generated while gate status is checked. The phone is "hung up" and gate open commands are then carried out for either minimum open periods or non-zero open hold times before restarting the function flow at the top of FIG. 2.

It will now be understood that what has been disclosed herein comprises a remote telephone-based gate command system for use with automatic gate control operations in a wireless system. The preferred embodiment disclosed herein permits an authorized caller to command gate opening from any remote location using a secure pin number and responding voice prompts generated by the system. A particularly unique feature of the preferred embodiment is a selectable gate open hold command, which permits selection of lengthy periods of an open gate operation, such as to accommodate maintenance personnel seeking entry to a secured property for up to several hours. The scope hereof is to be established by the appended claims and not necessarily by the exemplary embodiment herein.

We claim:

1. A method of controlling the opening and closing of an automatic gate from a remote location using a telephone network for a distant caller authorized to control gate operation from the remote location; the method comprising the steps of:

providing a local telephone interface connected to said telephone network at a location that is closer to said automatic gate than is said distant caller;

processing DTMF signals initiated by said distant caller by converting said signals into gate operator commands; and transferring said commands to a selected gate control operator for opening and closing a corresponding gate;

at least two of said commands being selected periods of time for holding said gate in an open state for at least two different time periods.

2. The method recited in claim 1 wherein at least one of said two commands for holding said gate in an open state corresponds to a time period exceeding at least one hour.

* * * * *